2 Sheets--Sheet 1.
W. HARSEN.
Rock-Drills.
No. 6,009.
Reissued Aug. 11, 1874.
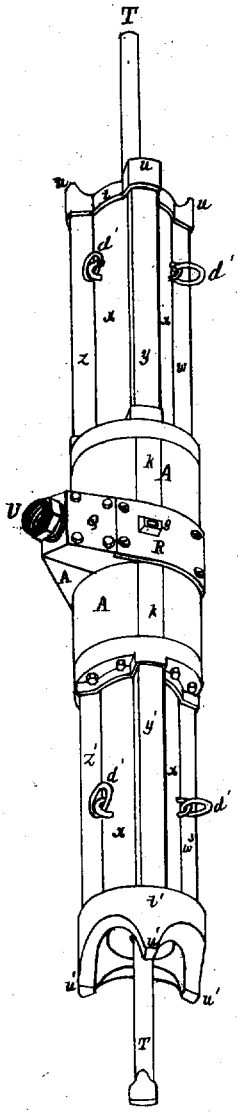
FIG. 1.
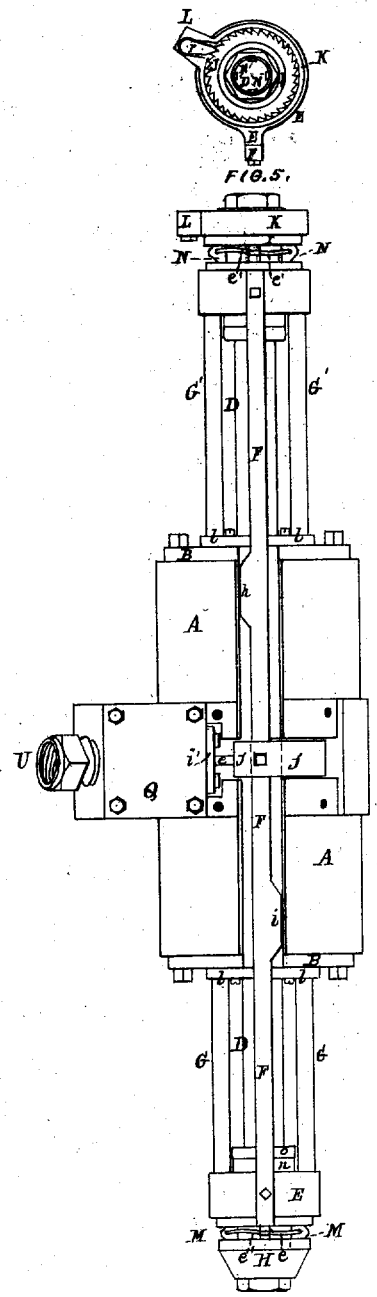
FIG. 5.
FIG. 2.
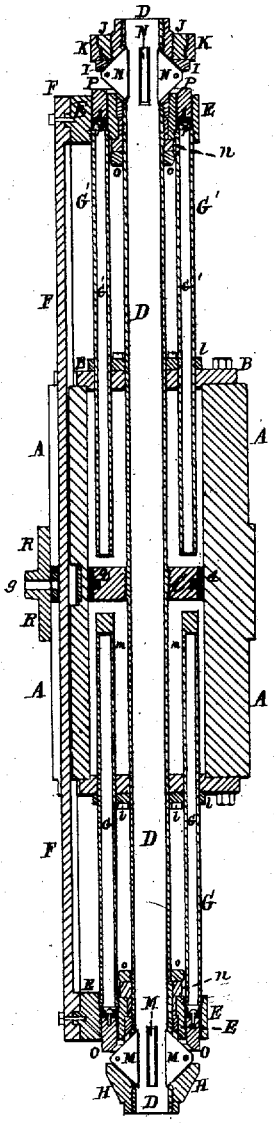
FIG. 3.
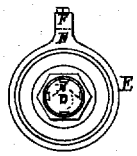
FIG. 4
WITNESSES.
Walter B. Bailey
Hosea Hyde
INVENTOR.
Wm. Harsen
Burleigh Rock-Drill Company
by Geo. E. Tinn President W. HARSEN. 2 Sheets--Sheet 2.

Rock-Drills.

No. 6,009. Reissued Aug. 1, 1874.

WITNESSES.

Walter C. Bailey

Hosea Hyde

INVENTOR.

W. Harsen

Burleigh Rock Drill Company

Cy G. Storme President

UNITED STATES PATENT OFFICE.

WILLIAM HARSEN, OF BROOKLYN, NEW YORK, ASSIGNOR, BY MESNE ASSIGNMENTS, TO THE BURLEIGH ROCK-DRILL COMPANY.

IMPROVEMENT IN ROCK-DRILLS.

Specification forming part of Letters Patent No. 426, dated February 12, 1861; reissue No. 6,009, dated August 11, 1874; application filed January 13, 1874.

*To all whom it may concern:*

Be it known that WILLIAM HARSEN, of Brooklyn and State of New York, invented a new and useful Portable Pneumatic Rock-Drill; and THE BURLEIGH ROCK-DRILL COMPANY, assignees of all right, title, and interest in said invention, and the said HARSEN hereby declare the following to be a correct description of the same, reference being had to the accompanying drawings, in which—

Figure 8:
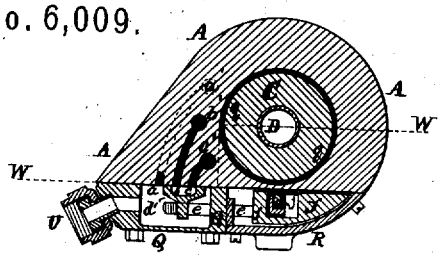
Figure 10:
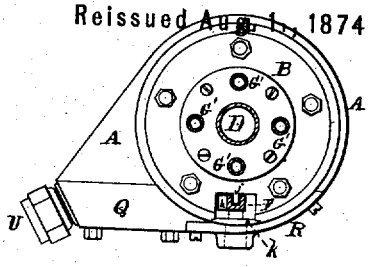
Figure 6:
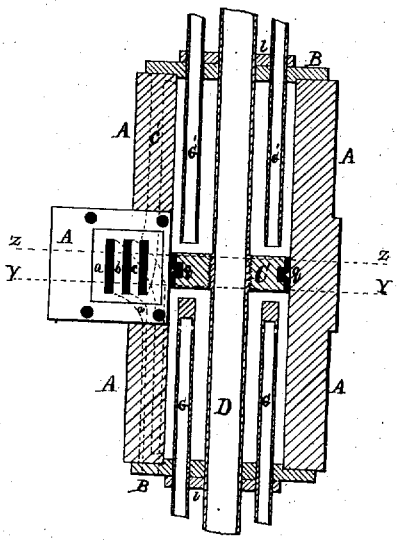
Figure 11:
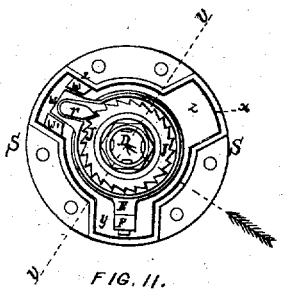
Figure 12:
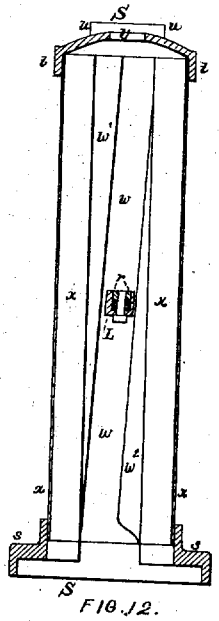
Figure 7:
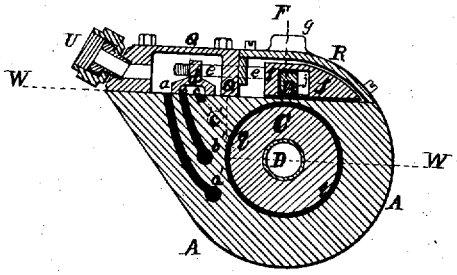
Figure 9:
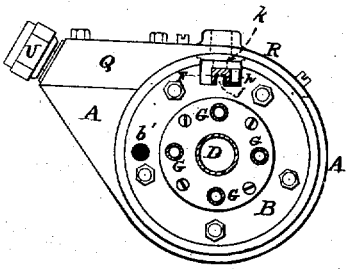

Figure 1 is a perspective view of the drill complete, drawn to a smaller scale than the other figures. Fig. 2 is a side elevation of the same with the shells removed. Fig. 3 is a longitudinal section through the tappet-bar. Fig. 4 is a bottom-end view. Fig. 5 is a top-end view. Fig. 6 is a longitudinal section through lines W W of Figs. 7 and 8. Fig. 7 is a transverse section through lines Y Y of Figs. 2 and 6. Fig. 8 is a transverse section through lines Z Z of Figs. 2 and 6. Fig. 9 is an end view of Fig. 6 in direction of arrow marked 13. Fig. 10 is an end view of Fig. 6 in the direction of the arrow marked 14. Fig. 11 is a transverse section of the upper shell, with the upper end of the machine shown therein. Fig. 12 is a longitudinal section of the upper shell in the direction of the arrow 15.

The same part is marked by the same letter of reference wherever it occurs.

This invention relates to the construction of a rock-drill to be operated by steam or compressed air, and which is, at the same time, portable, capable of operation in any direction, and exposed to wear only in parts which can be readily and cheaply renewed, and the operative parts of which are arranged within a casing, or inclosure, or covering forming the body of the machine, by which they are protected from the dirt and grit to which the drill is exposed in use, all as hereinafter more particularly set forth.

The first part of this invention relates to the method of operating the drilling-tool directly by the piston, upon which the steam or compressed air acts. In this machine the piston and its attachments have a rapidly-reciprocating free movement in the cylinder without being controlled by a crank, as is usual in steam-engines. The piston-rod is made hollow, and the drill-bar slides loosely through it, and is connected with the piston-rod, so as to be carried back and forth by it by suitable clamping devices, and is released from the same at the proper time to allow the drill to strike the rock by its momentum. This part of this invention, therefore, consists in combining the drill-rod with the free-moving piston-rod by means of inclined gibs or wedges, which are attached to and operated in combination with the piston-rod, and grasp the drill-bar while it is thrown forward and drawn back, and release it when the blow is struck, by means of the pressure of the steam or compressed air by which the piston is driven, which tightens the gibs or wedges by which the drill-bar is held to the piston-rod; and it also consists in certain devices, to be described, by which this mode of operation is carried out.

The second part of this invention relates to the method of operating the valve where the rapidly-reciprocating piston has a free movement in its cylinder, as before stated. In such case there is nothing to accurately determine the length of the stroke of the piston, as its motion is arrested at each limit by the cushioning of the air or steam between the cylinder-head and piston, and the extent of which motion varies with the varying speed of working and the working-pressure of the steam or air, and other conditions, while at the same time the movement of the piston is the only movement in the machine by which the valve can be operated. This part of the invention, therefore, consists in operating the valve in connection with a piston moving freely in its cylinder, as described, by means of two cams connected with the piston, and moving with it, which act upon two corresponding contact-surfaces of the valve-gear to move the valve in opposite directions at the proper points in the stroke of the piston, such contact-surfaces being so arranged in relation to the movement of the cams that they will be moved laterally or transverely thereto, so that when each cam has produced the proper movement of the valve it can continue its movement with the piston indefinitely without further affecting the valve or breaking the machine, as will be described.

The third part of this invention relates to the means of protecting the operative parts of the machine from the destructive effect of the dirt and grit produced by the abrasion of the rock; and consists in combining and arranging the operative parts of the machine within an inclosure or casing, which, with the cylinder and its fixed attachments, forms the body of the machine; and it also consists in the combination, with said inclosure or casing, of the exhaust-passage from the valve, so arranged that the exhausted air or steam will be discharged within the casing or inclosure, and flow out through the external openings of the same, by which the ingress of dust or grit through said openings is prevented; and it also consists in the combination, with the cylinder and valve mechanism, of a separate and removable cover, to give access to the valve-rod and its stuffing-box without disturbing the rest of the inclosure.

To enable others to make and use this improved drill, we will proceed to describe its construction and operation, with reference to the drawings, in which—

A marks the cylinder or main body of the machine; B, the cylinder-heads; and C, the piston attached to D, the hollow piston-rod. Attached to the ends of the piston-rod by collars are heads E, which allow the rod to rotate in them, but have no end play. F is the tappet-bar, secured at its ends to the heads E, and therefore has the same motion as the piston-rod. G G′ mark tubes fixed to heads E, and play through stuffing-boxes into the cylinder in lines parallel to the piston-rod. H is a bottom-piece, firmly secured to the piston-rod, and forming, with piece *n′*, collars which embrace one of the heads E, as shown. I is a top piece, secured to the piston-rod and forming collars with the piece *n*, which embrace the other head E. J is the ratchet-wheel for revolving the drill. K is a band which loosely embraces the ratchet-wheel J, and L is a projection from the band K, having in it a spring-pawl, *r*. M M, &c., are the lower gibs for griping the drill-bar, and N N, &c., are upper gibs for the same purpose. O is a ring for operating the gibs M. P is a ring for operating gibs N. Q marks the steam or air chest. R is a cap or plate covering the valve-rod connections, to give access to the same without disturbing the rest of the casing. S S are shells covering and protecting from injury the ends of the machine. T is the drilling-tool. U is a coupling connecting the valve-chest with a tube or pipe from the steam-boiler or air-pump, which is the source of power. *a* marks the lower inlet-port; *b*, the exhaust-port; *c*, the upper inlet-port; *d*, the valve; *e*, the valve-rod; *f*, a sliding block in which the tappet-bar F works to move the valve. *g* is a projection forming a fulcrum for a starting-lever. *h* is the upper tappet or cam, and *i* the lower tappet or cam. *j* is the feather on which bar F slides, and by which it is steadied; *k*, movable caps; *l*, stuffing-box glands; *m*, holes in the sides of tubes G; *n n′*, collar-pieces fixed to piston-rod; *o*, leather buffer on piece *n*; *p*, leather packing-head on rings O and P; *q*, piston-packing; *r*, spring-pawl working into ratchet-wheel J; *s s′*, bases of shells; *t t′*, caps of shells; *u u′*, horns of caps *t t′*, upon which the machine rests when at work; *v*, orifice through which the drill T passes and plays; *w*, channel in which the pieces $w^1$ $w^2$ form a spiral way for guiding the motion of projection L; *x x′*, walls of shells S; *y* and *z*, *y′ z′*, and $w^3$, channels on the interior of shells S, to accommodate projecting parts of the machine; *a′*, the way from inlet-port *a* into cylinder; *b′*, the outlet for exhaust, which leads into the lower shell or casing; *c′*, the way from inlet-port *c* into cylinder; *d′*, rings for handling and securing the machine. *e′* are light wire springs to hold the gibs out; *i′*, stuffing-box gland for valve-rod.

The construction of the cylinder, piston, valves, steam-chest, &c., is essentially like that of the simplest form of steam-engine. The cylinder A, of the usual form, is provided with substantial heads B and stuffing-boxes *l*. The piston *c* has the ordinary packing, shown in black at *q*, Figs. 3, 6, 7, and 8, and receives and is firmly attached to the piston-rod D. The piston-rod D is hollow throughout its entire length, and is attached at its middle to the piston C, and has a reciprocating motion with it, in the usual way. At either end of the rod D are attached the collars I *n* and H *n′*, which snugly confine the annular heads E, and are capable of revolving in them, but have no end play. To these heads the tappet-bar F is strongly framed. (See Figs. 2 and 3.) Each of the heads E has in it a deep annular groove for the reception of the rings O and P, respectively, and opposite to and communicating with these grooves are the tubes G on the lower end and the tubes G′ on the upper. These tubes G G′ pass through stuffing-boxes into the cylinder A, and terminate near the piston C, as clearly shown in Figs. 3 and 6. Being part of the same system with the piston-rod D, they move with it. The tubes G are closed at their inner ends, and open at the ends which are inserted into the head E. They have near their inner ends the small lateral openings *m*. The tubes G′ are open at both ends. The rings O and P are beveled on the inner side of their outer ends, to correspond with the angle of their respective gibs M and N. Their inner faces are provided with packing, shown in black at *p*, Fig. 3, to render air-tight their connection with the tubes G G′. The bottom-piece H and collar I at the top are made with slanting channels, upon which the gibs M and N bear and slide, as shown in Fig. 3, to grasp the drill-bar and carry it back and forth by the piston-rod. The tappet-bar F has a groove in its under side, extending its whole length, and traverses upon a feather, *j*, made to fit this groove. Its sides are armed with the tappets or cams *h* and *i*, which are placed at the proper points to operate the valve at

BEST AVAILABLE COPY the right time. The sliding block *f* works in suitable guides transversely to the bar F, and in a line with the valve-rod, and has a mortise through it, in which the bar F plays, and causes the cams *h* and *i* alternately to strike the ends of the mortise, and move the block *f* back and forth transversely thereto, and thus work the valve-rod *e*. The projection of the cams *h* and *i* from the body of the rod F is just sufficient to move the valve from one extreme to the other. The outer surfaces of the cams are made parallel with the length of the rod, as shown, and, as the mortise in the block *f* is just filled by the cams and rod while passing through it, the motion of the valve is made positive and accurate, and the further movement of the rod F may be continued indefinitely without producing any further effect upon the valve. This mode of operating the valve is of vital importance in a rock-drill where the piston and parts attached to it have a rapidly reciprocating and variable movement in the cylinder, and the valve is worked directly by its motion, so that the movement of the valve may be positive and uniform, and the destruction of the valve mechanism prevented, and the mechanism arranged in a compact form that can be inclosed within a casing or inclosure of convenient size for use. A small transverse mortise is also made in the top of slide-block *f*, (see Fig. 2,) to receive the end of a starting-lever, which may be inserted through the fulcrum piece *g*, Fig. 1. The valve-rod *e* is secured to the block *f*, and passes through the stuffing-box *i* into the valve-box, and is attached at its inner end to the valve *d*. (See Figs. 7 and 8.) The slide-block *f* works in a recess in the cylinder, as shown, which is covered with a plate, R, which can be separately removed to get access to the stuffing-box of the valve-rod, but when in place forms a part of the external casing or inclosure of the machine. The ratchet-wheel J (Figs. 3 and 5) forms part of collar I, so that when it turns that collar the piston-rod D attached to it will turn at the same time. Outside of the collar I and ratchet-wheel J is placed the annular band K with its projection L, which contains the spring-pawl *r*. By this construction and arrangement the band K plays freely around the ratchet-wheel J in one direction, but carries the wheel, collar, and piston-rod around with it in the other direction. (See Figs. 2, 3, and 5.) The projection L is made to fit a spiral groove in one of the channels of the upper shell, as shown in Fig. 12, and by sliding up and down in that groove operates the pawl and ratchet. The air or steam chest Q is provided with a nozzle or coupling, U, by which a connection may be made with a tube or pipe leading from a steam-boiler or air-pump, or other source of power. The working ends of the machine are protected from injury by being incased in shells S of proper size and shape to contain them, which, in connection with the cylinder, form the body of the machine, and, with the covers R and *k k*, completely inclose all the working parts and protect them from the dirt and grit. One of the ribs or channels of the upper shell is fitted with two wedge-shaped pieces, $w^1$ and $w^2$, for the purpose of making a slanting or spiral groove for the projection L to work in, as hereinbefore described, and shown in Fig. 12. Rings $d^1$, Fig. 1, are attached to the outside of the shells for the purposes of fastening the machine or for handling it.

The operation of the machine is as follows: The drill-bar or tool T having been inserted in the hollow of the piston-rod D, motion is imparted to the piston by means of steam or compressed air, which is let in through the nozzle U into the steam or air chest Q. The air thus admitted passes through the inlet-port *a* and way *a'* into the cylinder below the piston, and forces it upward. As soon as it has moved upward a short distance, the holes *m* in the sides of the tubes G are brought into the interior of the cylinder A, when the air or steam at once rushes through them into the tubes, and, exerting its pressure against the inner face of the ring O, drives that ring outward against the inclined sides of the gibs M, pressing the gibs inward toward the center of the piston-rod, and causing them to gripe the drill-bar tightly and hold it until released by a reversal of the position of the valve, just before the piston has reached the end of its upward stroke. The cam *i* then changes the valve, and the lead gives an air-cushion for the piston, and thereby prevents shock. By the change of the valve just mentioned the steam or air is directed into port *c*, and through way *c'* to the upper side of the piston, while the steam or air in the lower side is exhausted in the usual way, through exhaust-port *b*, into the interior of the casing, as shown, and escapes into the open air through the openings and joints of the same, and prevents the ingress of gritty dust or dirt from the abrasion of the rock, and thus protects the working parts from rapid destruction. While the piston is being driven down the air or steam enters tubes G', and, pressing upon ring P, drives its beveled edge against gibs N, which are thus forced in against the tool, and firmly grasp it and carry it down to its stroke against the rock. The piston is cushioned, at the end of its downward stroke, by the lead, in the same manner as in its upward stroke. During the upward stroke of the piston the piston-rod, with the tool held within it, is turned part of a revolution by the ratchet-wheel, which is operated by the pawl attached to projection L. During the downward stroke the pawl slips over the teeth of the wheel, and does not turn the tool.

It will be observed that when the drill strikes the rock to be drilled, its rebound, instead of producing a destructive jar or shock to the machine, merely causes the tool itself to slip through the griping-gib which are thus the only parts exposed to any considerable wear. As they can be cheaply and readily replaced, as often as may be required—one of the chief objections to machines of this class—their rapid destruction is completely obviated.

It will be further observed that if the lower gibs were made to gripe the tool at the same time that it struck the rock, it would grasp it so near its lower end as to impair the efficiency of the succeeding blow. To prevent this the gibs M are not operated until the piston has made so much of its upward stroke as to bring the holes *m*, in the sides of tube G, within the cylinder. Thus they are made to take hold of the tool at a point sufficiently high to insure a good blow at the following downward stroke.

It is obvious that by substituting a hammer or pounding tool for the drill-bit, the machine may be used as a pounding or stamping engine, for the reduction of ores, &c. We contemplate using it for such purposes.

Having thus fully described the invention, what we claim, and desire to secure by Letters Patent, is—

1. The combination of the free-moving piston, the detached drill-bar, and the holding and releasing mechanism which holds and releases the drill-bar, substantially as described.

2. The combination of the gibs M N, the hollow piston-rod D, and mechanism for operating said gibs, constructed and operating substantially as described.

3. The combination of the hollow piston-rod D, the gibs M N, and the rings O P, constructed and arranged for conjoint operation, substantially as described.

4. The combination of the rings O P with the tubes G G′ and the cylinder A, in the manner and for the purpose substantially as described.

5. The tubes G, provided with holes *m*, in combination with the stuffing-box glands *l*, substantially as described.

6. In a rock-drilling machine in which the drill is attached to a free-moving piston, and is driven in both directions by compressed air or steam, the method of operating the valve by means of two cams, attached to and moving with the piston, acting upon two contact surfaces of the valve-gear moving transversely thereto, to give positive motions to the valve, substantially as described.

7. The combination of the tappet-bar F, slotted block *f*, and valve-rod *e*, constructed and operating as and for the purpose described.

8. The shells and covers, in combination with the cylinder forming a casing or inclosure for inclosing and protecting the operative parts of the machine, substantially as described.

9. The combination of the exhaust-passage with the interior of the casing or inclosure, for the purpose of preventing the ingress of the dirt or grit, substantially as described.

10. The cover R, in combination with the cylinder, valve-gear, and valve-chest, for giving access to the valve-gear, substantially as described.

Executed January 10, 1874.

WM. HARSEN.
BURLEIGH ROCK-DRILL CO.,
By GEO. E. TOWNE, *Prest.*

Witnesses:
WALTER B. BAILEY,
HOSEA HYDE.